United States Patent
Nagai

(10) Patent No.: US 10,497,355 B2
(45) Date of Patent: Dec. 3, 2019

(54) DRIVING INFORMATION RECORDING DEVICE, DRIVING INFORMATION PLAYBACK DEVICE, CONTROLLING DEVICE, DRIVING INFORMATION RECORDING METHOD, AND DRIVING INFORMATION RECORDING PROGRAM

(71) Applicant: JVC KENWOOD Corporation, Yokohama-shi, Kanagawa (JP)

(72) Inventor: Toshiaki Nagai, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 15/924,467

(22) Filed: Mar. 19, 2018

(65) Prior Publication Data
US 2018/0211648 A1 Jul. 26, 2018

Related U.S. Application Data

(63) Continuation of application No. PCT/JP2016/073393, filed on Aug. 9, 2016.

(30) Foreign Application Priority Data

Sep. 18, 2015 (JP) ................................. 2015-184698

(51) Int. Cl.
*G10K 11/178* (2006.01)
*G01H 1/04* (2006.01)
(Continued)

(52) U.S. Cl.
CPC ......... *G10K 11/17823* (2018.01); *G01H 1/04* (2013.01); *G01H 3/00* (2013.01);
(Continued)

(58) Field of Classification Search
None
See application file for complete search history.

(56) References Cited

U.S. PATENT DOCUMENTS 6,420,975 B1 * 7/2002 DeLine ..................... B60R 1/12
340/425.5
2008/0119966 A1 * 5/2008 Breed ..................... G07C 5/008
701/2
(Continued)

FOREIGN PATENT DOCUMENTS

JP 2001106123 A 4/2001

OTHER PUBLICATIONS

Cooper, Sean. "What you need to know about dashboard-mounted car cameras." pp. 1-7. Sep. 8, 2014.https://www.engadget.com/2014/09/08/dash-cams-explainer/.*

*Primary Examiner* — Qin Zhu
(74) *Attorney, Agent, or Firm* — Brundidge & Stanger, P.C.

(57) ABSTRACT

A first sound detection unit is installed in a predetermined member forming a vehicle so as to detect solid vibration of the member and convert the solid vibration into an electrical sound signal. A second sound detection unit detects vibration of air inside the vehicle and converts the vibration into an electrical sound signal. A data recording unit records at least one of the sound signal detected by the first sound detection unit and the sound signal detected by the second sound detection unit in a recording medium. The sound signal detected by the first detection unit and recorded in the recording medium is corrected by using the sound signal detected by the second sound detection unit, or the sound signal detected by the second detection unit and recorded in the recording medium is corrected by using the sound signal detected by the first detection unit.

11 Claims, 5 Drawing Sheets

(51) Int. Cl.
*G10K 15/00* (2006.01)
*G01H 3/00* (2006.01)
*G07C 5/08* (2006.01)
*G07C 5/00* (2006.01)

(52) U.S. Cl.
CPC .............. *G07C 5/00* (2013.01); *G07C 5/085* (2013.01); *G10K 15/00* (2013.01); *G10K 2210/12821* (2013.01); *G10K 2210/3028* (2013.01)

(56) References Cited

U.S. PATENT DOCUMENTS

| | | | |
|---|---|---|---|
| 2009/0060217 A1* | 3/2009 | Sakamoto | G10K 11/178 381/71.4 |
| 2009/0067638 A1* | 3/2009 | Sakamoto | G10K 11/178 381/71.4 |
| 2009/0251530 A1* | 10/2009 | Cilia | B60R 11/04 348/39 |
| 2011/0142248 A1* | 6/2011 | Sakamoto | G10K 11/178 381/71.4 |
| 2011/0170701 A1* | 7/2011 | Sakamoto | G10K 11/178 381/73.1 |
| 2012/0089299 A1* | 4/2012 | Breed | B60C 11/24 701/36 |
| 2014/0119567 A1* | 5/2014 | DeLine | B60R 1/12 381/86 |
| 2015/0036832 A1* | 2/2015 | Usher | H04R 3/005 381/56 |

* cited by examiner

DRIVING INFORMATION RECORDING DEVICE, DRIVING INFORMATION PLAYBACK DEVICE, CONTROLLING DEVICE, DRIVING INFORMATION RECORDING METHOD, AND DRIVING INFORMATION RECORDING PROGRAM

CROSS-REFERENCE TO RELATED APPLICATION

This application is a Continuation of International Application No. PCT/JP2016/073393, filed on Aug. 9, 2016, which in turn claims the benefit of Japanese Application No. 2015-184698, filed on Sep. 18, 2015, the disclosures of which Application is incorporated by reference herein.

BACKGROUND OF THE INVENTION

1. Field of the Invention

The present invention relates to driving information recording devices, driving information playback devices, controlling devices, driving information recording methods, and driving information recording programs that record driving information such as images and sound while a vehicle is being driven.

2. Description of the Related Art

Today, driving information recording devices (drive recorders) are installed in an increasing larger number of vehicles. Recording of images and sound in a driving information recording device during a travel contributes significantly to identification of a cause of an accident or resolution of a trouble. If a cause of an accident or a trouble is outside the angle of view of the camera so that an image thereof is not recorded, one must resort to recorded sound data.

[patent document 1] JP2001-106123

The sound collected by a microphone installed inside a vehicle contains a large road noise. Further, only those components of the sound outside the vehicle that enter the vehicle interior are collected by a microphone in the vehicle. Thus, the lack clearness of record data sometimes results in a failure to fully resolve a problem.

SUMMARY OF THE INVENTION

To address the aforementioned issue, a driving information recording device according to an embodiment comprises: a first sound detection unit installed in a predetermined member forming a vehicle so as to detect solid vibration of the member and convert the solid vibration into an electrical sound signal; a second sound detection unit that detects vibration of air inside the vehicle and converts the vibration into an electrical sound signal; and a data recording unit that records at least one of the sound signal detected by the first sound detection unit and the sound signal detected by the second sound detection unit in a recording medium. The sound signal detected by the first detection unit and recorded in the recording medium is corrected by using the sound signal detected by the second sound detection unit, or the sound signal detected by the second detection unit and recorded in the recording medium is corrected by using the sound signal detected by the first detection unit.

Another embodiment also relates to a driving information recording device. The device comprises: a first sound detection unit installed in a predetermined member forming a vehicle so as to detect solid vibration of the member and convert the solid vibration into an electrical sound signal; a second sound detection unit that detects vibration of air inside the vehicle and converts the vibration into an electrical sound signal; and a data recording unit that records the sound signal detected by the first sound detection unit and the sound signal detected by the second sound detection unit in a recording medium.

Another embodiment relates to a driving information playback device. The device comprises: a signal processing unit that performs at least one of i) a process of correcting a sound signal generated by a first sound detection unit installed in a predetermined member forming a vehicle to detect solid vibration of the member and convert the vibration into an electrical sound signal, by using a sound signal generated by a second sound detection unit that detects vibration of air in the vehicle and converts the vibration into an electrical sound signal, and ii) a process of correcting the sound signal generated by the second sound detection unit by using the sound signal generated by the first sound detection unit; and a sound playback unit that plays back the sound signal generated by the first sound detection unit and corrected by the signal processing unit, or the sound signal generated by the second sound detection unit and corrected by the signal processing unit.

Another embodiment relates to a controlling device. The controller comprises: a signal processing unit that performs at least one of i) a process of correcting a sound signal generated by a first sound detection unit installed in a predetermined member forming a vehicle to detect solid vibration of the member and convert the vibration into an electrical sound signal, by using a sound signal generated by a second sound detection unit that detects vibration of air in the vehicle and converts the vibration into an electrical sound signal, and ii) a process of correcting the sound signal generated by the second sound detection unit by using the sound signal generated by the first sound detection unit; and a data recording unit that records at least one of the sound signal detected by the first sound detection unit and corrected by the signal processing unit, and the sound signal detected by the second sound detection unit and corrected by the signal processing unit in a recording medium.

Another embodiment relates to a driving information recording method. The method comprises: performing at least one of i) a process of correcting a sound signal generated by a first sound detection unit installed in a predetermined member forming a vehicle to detect solid vibration of the member and convert the vibration into an electrical sound signal, by using a sound signal generated by a second sound detection unit that detects vibration of air in the vehicle and converts the vibration into an electrical sound signal, and ii) a process of correcting the sound signal generated by the second sound detection unit by using the sound signal generated by the first sound detection unit; and recording at least one of the sound signal detected by the first sound detection unit and corrected, and the sound signal detected by the second sound detection unit and corrected in a recording medium.

Optional combinations of the aforementioned constituting elements, and implementations of the embodiment in the form of methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
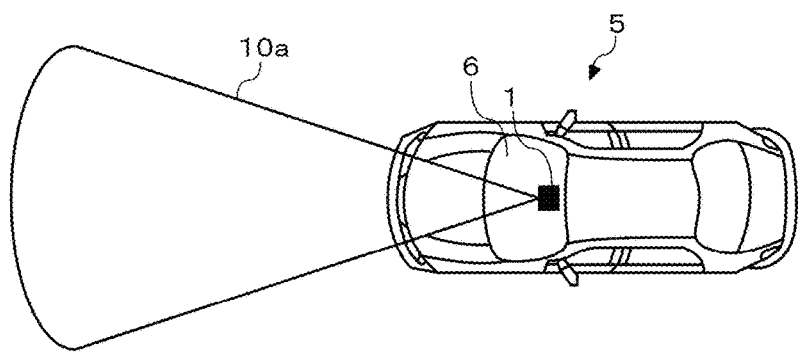
FIG. 1 shows an example of installation of a driving information recording device according to the embodiment of the present invention.

The invention will now be described by reference to the preferred embodiments. This does not intend to limit the scope of the present invention, but to exemplify the invention.

A driving information recording device installed on a vehicle is primarily used to record accidents or mishaps, to give guidance on safe driving, etc. Driving information recording devices are used to manage the operation of vehicles in taxi companies and transport companies and to image the scenery during a drive in personal applications. For example, an impact accident at an intersection sometimes results in drivers quarreling over the color of a traffic signal. In other cases, those who deliberately gets knocked down by an automobile may demand insurance money or compensation to settle the case, by causing a traffic accident deliberately. In these cases, information recorded by driving information recording devices is of great help.

Driving information recording devices are broadly categorized into a continuous recording type and an event-driven recording type. A continuous recording type records images in a non-interrupted manner and so requires a large recording capacity. Meanwhile, an event-driven recording type records images before and after an accident occurs and so can save the recording capacity. There is also available a hybrid type featuring both continuous recording and event-driven recording by dividing the recording area of the recording medium into areas for continuous recording and for event-driven recording and lowering the resolution/frame rate of images continuously recorded.

Cameras used in related-art mainstream driving information recording devices have the VGA (640×480 pixels) resolution so that images capturing accident situations are not clear. Cameras used in today's driving information recording devices have increasingly higher resolutions. Cameras with full HD (1920×1080 pixels) resolution are being commercialized. These cameras are capable of capturing clearer images but require a larger recording capacity accordingly.

A method whereby an acceleration sensor detects abnormal movement of a vehicle and the information before and after that movement is recorded is proposed as a method of saving the recording capacity. However, an acceleration sensor alone is sometimes not enough to respond to a minor shock.

There is also proposed a method whereby images of the neighborhood of a vehicle are captured and recorded at a low frame rate in a normal mode, and, when a magnetic sensor or a human body sensor detects another vehicle or a person approaching, images are captured and recorded at a high frame rate. If the sensor does not react, however, images at the time of the accident will be recorded in a low frame rate quality.

Aside from driving information recording devices that capture images outside a vehicle, some driving information recording devices capture images of the interior of a vehicle. In that case, image data relevant to whether the driver is at fault can be recorded. However, not few users feel reluctant to having a camera for capturing images of the interior of a vehicle installed. This is addressed by installing a microphone in the interior of a vehicle and recording, for example, the sound of an activated blinker.

Thus, a majority of existent driving information recording devices include a microphone installed in the interior of the vehicle and not outside the vehicle. For this reason, the recorded data of driving information recording devices only includes the sound entering the interior of the vehicle. If, for example, an image of the vehicle that the driver's vehicle ran into in an impact accident is not captured by the camera, the situation may have to be estimated from the sound of the brake or the horn. However, it is difficult for the sound of the tire of another vehicle, brake, horn, siren, railroad crossing, etc. to enter the interior of a vehicle that is highly quiet so that the sound recorded by the microphone in the interior of the vehicle is often of a low quality. In a vehicle that is less quiet inside, on the other hand, the noise (sound entering from outside or road noise) is large so that the sound of the activated blinker in the interior of the vehicle could not be recorded with a high quality.

Thus, there is proposed a device configured to collect the sound outside the interior of a vehicle with a microphone in the interior of the vehicle by collecting the sound outside the interior of the vehicle and playing back the sound in the interior of the vehicle. If a microphone is installed outside the vehicle (more specifically, outside the cabin) in order to collect the sound outside the vehicle, wind noise created by driving the vehicle or by the weather is collected by the microphone. When the vehicle is driven at a high speed, it would not be possible to address the wind noise even if the microphone is capped by a windshield.

Further, a windshield that is not waterproof may cause the microphone to be damaged by the rain. Still further, the performance of a microphone installed outside a vehicle is easily degraded as compared with a microphone installed in the interior of a vehicle due to the poor environment of installation.

There is also proposed a device in which a microphone or a sensor is installed outside the interior of a vehicle to collect the sound outside the vehicle in accordance with the vehicle condition such as the vehicle speed, and the associated sound information is provided to the driver. A disadvantage with this device is that the sound heard by the driver is from a virtual sound source and so is different from the actual sound.

In all of these cases above, the microphone installed in the interior of the vehicle collects the sound inside the vehicle, the sound outside entering the interior of the vehicle, and the road noise at the same time. Accordingly, it is difficult to distinguish which sound has entered from outside the vehicle.

This is addressed in the embodiment described below by using a vibration sensor to collect the sound outside the vehicle without installing a microphone outside the vehicle, to isolate the sound sources inside and outside the vehicle, and to reduce the impact from the road noise.

FIG. 1 shows an example of installation of a driving information recording device 1 according to the embodiment of the present invention. The driving information recording device 1 is installed on the inner side of a front glass 6 of a vehicle 5 (e.g., in the neighborhood of the rear side of the room mirror). For example, the mounting fixture (also referred to as mount base, holder, stay) of the driving information recording device 1 and inner surface of the front glass 6 are fixed by a double-sided adhesive tape. In this specification, it is assumed that the scenery in front of a vehicle is imaged. Therefore, the the camera is oriented so that an angle of view 10a faces the space in front of the vehicle.

(Embodiment 1)

Figure 2:
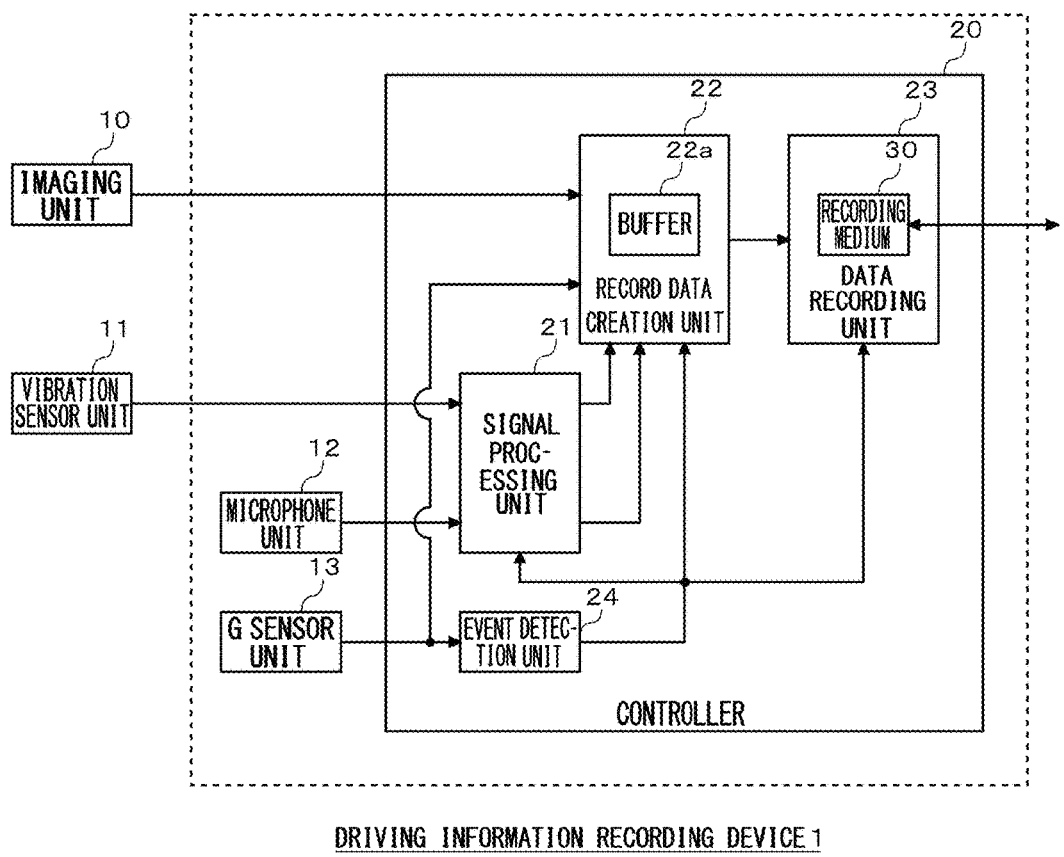
FIG. 2 is a block diagram showing a configuration of the driving information recording device according to embodiment 1 of the present invention.

FIG. 2 is a block diagram showing a configuration of the driving information recording device 1 according to embodiment 1 of the present invention. The driving information recording device 1 includes an imaging unit 10, a vibration sensor unit 11, a microphone unit 12, a G sensor unit 13, and a controller 20. In this embodiment, the microphone unit 12, the G sensor unit 13, and the controller 20 are provided in the housing of the main body. The imaging unit 10 may be provided in the housing of the main unit, or fitted to the mounting fixture, or provided outside the housing. In case the imaging unit 10 is fitted to the mounting fixture or provided outside the housing, the imaging unit 10 and the controller 20 are connected by wirings. The vibration sensor unit 11 is installed by being fixed to a predetermined member forming the vehicle 5. The vibration sensor unit 11 and the controller 20 are connected by wirings.

The controller 20 includes a signal processing unit 21, a record data creation unit 22, a data recording unit 23, and an event detection unit 24. These functional blocks are implemented by the coordination of hardware resources and software resources, or hardware resources alone. A processor, ROM, RAM, FPGA, and other LSIs can be used as hardware resources. Programs such as operating systems and applications can be used as software resources.

The imaging unit 10 includes a solid state image sensing device and an image signal processing circuit (not shown). The solid state image sensing device is formed by a CMOS image sensor or a CCD image sensor and converts an incident light into an electrical image signal. The image signal processing circuit subjects the image signal output from the solid state image sensing device to a signal process such as A/D conversion, noise rejection, etc. and outputs the processed signal to the record data creation unit 22.

In this embodiment, the imaging unit 10 is installed on the inner side of the front glass 6 to image the scenery in front of the vehicle. The imaging direction of the imaging unit 10 is not limited to the direction ahead of the vehicle but may be behind the vehicle, or to the side of the vehicle. In these alternative cases, the imaging unit 10 is installed at a position capable of capturing images in the relevant direction. The imaging unit 10 may be installed to be oriented to capture images of the driver or passengers in the interior of the vehicle. The number of imaging units 10 may not be limited to one, and a plurality of imaging units 10 may be provided. The range that one imaging unit 10 is capable of capturing depends on the position of installation and the performance of the lens. The imaging unit 10 has a dead zone so that the dead zone can be reduced by installing a plurality of imaging units 10.

The vibration sensor unit 11 detects the solid vibration of a member in which it is installed, converts the vibration into an electrical sound signal (hereinafter, referred to as the first sound signal) and outputs the sound signal to the signal processing unit 21. In this embodiment, the vibration sensor unit 11 is installed by being fixed on the inner side of the front glass 6. For example, the vibration sensor unit 11 may be fixed to a mounting fixture so that, when the mounting fixture is adhesively attached to the front glass 6, the vibration sensor unit 11 comes into contact with the front glass 6. In this case, the vibration sensor unit 11 detects the vibration transmitted to the front glass 6 and converts the vibration into the first sound signal.

The vibration transmitted to the front glass 6 is a composite vibration signal including a combination of the vibration created as the sound arriving from outside the vehicle is transmitted through the front glass 6, the vibration created as the sound arriving from inside the vehicle is transmitted through the front glass 6, and the vehicle vibration caused by the traveling vehicle. The vibration energy of the sound arriving from outside the vehicle and transmitted through the front glass 6 is given by (expression 1) below. The vibration energy of the sound arriving from inside the vehicle and transmitted through the front glass 6 is also given by (expression 1) below.

Incoming sound=reflected sound+absorbed sound+ transmitted sound    (expression 1)

The vehicle vibration caused by the traveling vehicle (vibration from the engine, vibration transmitted from the road surface to the vehicle body) is transmitted to the front glass 6 as a sound propagated through a solid. The resultant vibration of the front glass 6 causes the road noise. Thus, the vibration of the front glass 6 includes the vibration that causes the road noise.

The vibration sensor unit 11 includes, for example, an acceleration sensor, and the acceleration sensor detects the vibration of the front glass 6. A stethoscope may be used in place of the acceleration sensor. In this case, the stethoscope is intimately attached to the front glass 6. The solid vibration of the front glass 6 is converted into air vibration and the air vibration is collected by the microphone. Other devices having a mechanism to convert solid vibration into air vibration by means of a diaphragm etc. may be used instead of the stethoscope.

The position of installation of the vibration sensor unit 11 is not limited to the position on the inner side of the front glass 6. For example, the vibration sensor unit 11 may be installed inside the side window or inside the rear window. In this case, the sound outside vehicle arriving from the side or from behind can be collected with a high sensitivity. The vibration sensor unit 11 may be installed inside or on the inner side of a plate member forming the vehicle 5 such as a bonnet, roof, door panel, quarter panel, trunk, bumper, and number plate.

Side windows commonly in use are provided with a mechanism to open or close the window. Thus, if the vibration sensor unit 11 is provided on the side window, the vibration caused by the movement of the mechanism may interfere. By installing the vibration sensor unit 11 inside the door panel or quarter panel instead of the side window, the sound arriving from the side can be collected with a high sensitivity.

The vibration sensor unit 11 may be installed such that the imaging direction of the imaging unit 10 is aligned with the direction in which the sound is sought to be collected with a high sensitivity. If the imaging unit 10 is configured to image in the forward direction of the vehicle, the larger the plane of the plate member substantially perpendicular to the sound from ahead the vehicle, the higher the sensitivity that the sound from ahead the vehicle can be collected. It can be said that the front glass 6, front bumper, and front number plate are plate members having a relatively large plane substantially perpendicular to the sound from ahead the vehicle. Of these, it is easiest to install the vibration sensor unit 11 on the inner side of the front glass 6. The required length of the wirings will be shortest. Therefore, an example of installing the vibration sensor unit 11 on the inner side of the front glass 6 is described by way of example in this embodiment.

The microphone unit 12 detects the air vibration in the vehicle interior, converts the vibration into an electrical sound signal (hereinafter, referred to as "the second sound signal"), and outputs the sound signal to the signal processing unit 21. An ordinary omnidirectional microphone can be used for the microphone unit 12. The microphone unit 12 is installed in the vehicle interior and so can collect the sound in the vehicle as a whole. The sound in the vehicle is a composite sound signal including a combination of the sound entering from outside the vehicle, the sound inside the vehicle, and the sound caused by the traveling vehicle.

The vibration sensor unit 11 subjects the first sound signal to A/D conversion and outputs the converted signal to the signal processing unit 21. The microphone unit 12 subjects the second sound signal to A/D conversion and outputs the converted signal to the signal processing unit 21.

The first sound signal and the second sound signal are sampled in an A/D converter at a sampling rate corresponding to the audible frequency range (20 [Hz] から 20 [kHz]). For example, it is possible to collect the sound up to 24 [kHz] by setting the sampling rate at 48 [kHz].

The sampling rate is not limited to 48 [kHz]. A low sampling rate may be used in order to reduce the computational volume. For example, by setting the sampling rate at 8 [kHz], the sound up to 4 [kHz] can be collected. If the processing power of the controller 20 is low, it is necessary to maintain the computational volume low. The lower the sampling rate, the more successfully the computational volume is reduced but the lower the sound quality of the recorded data (tradeoff).

The A/D converter may be provided in each of the vibration sensor unit 11 and the microphone unit 12, or provided in a stage preceding the signal processing unit 21 in the controller 20.

The signal processing unit 21 corrects the first sound signal input from the vibration sensor unit 11 by using the second sound signal input from the microphone unit 12.

More specifically, the signal processing unit 21 removes the second sound signal input from the microphone unit 12 as a noise component from the first sound signal input from the vibration sensor unit 11. This reduces the sound inside the vehicle and the road noise and generates an extra-vehicular sound signal in which the sound outside the vehicle is emphasized.

Similarly, the signal processing unit 21 corrects the second sound signal input from the microphone unit 12 by using the first sound signal input from the vibration sensor unit 11. More specifically, the signal processing unit 21 removes the first sound signal input from the vibration sensor unit 11 as a noise component from the second sound signal input from the microphone unit 12. This reduces the sound outside the vehicle and the road noise and generates an intra-vehicular sound signal in which the sound inside the vehicle is emphasized.

A description will now be given of an example of generating the extra-vehicular sound signal and the intra-vehicular sound signal from the first sound signal input from the vibration sensor unit 11 and the second sound signal input from the microphone unit 12, by using two adaptive filters. An adaptive filter generates a response signal by using a reference signal and an error signal and generates an output signal by subtracting the response signal from a desired signal (target signal). The output signal is fed back as the error signal to the adaptive filter so as to update the filter coefficient.

In a case where the adaptive filter is used for noise cancellation, the reference signal is the noise, the desired signal is the sound signal including the noise, and the output signal is the sound signal in which the noise is removed. By estimating an unknown system from a noise source to a sound collecting unit by using the adaptive filter, the noise can be removed with a high precision.

Figure 3:
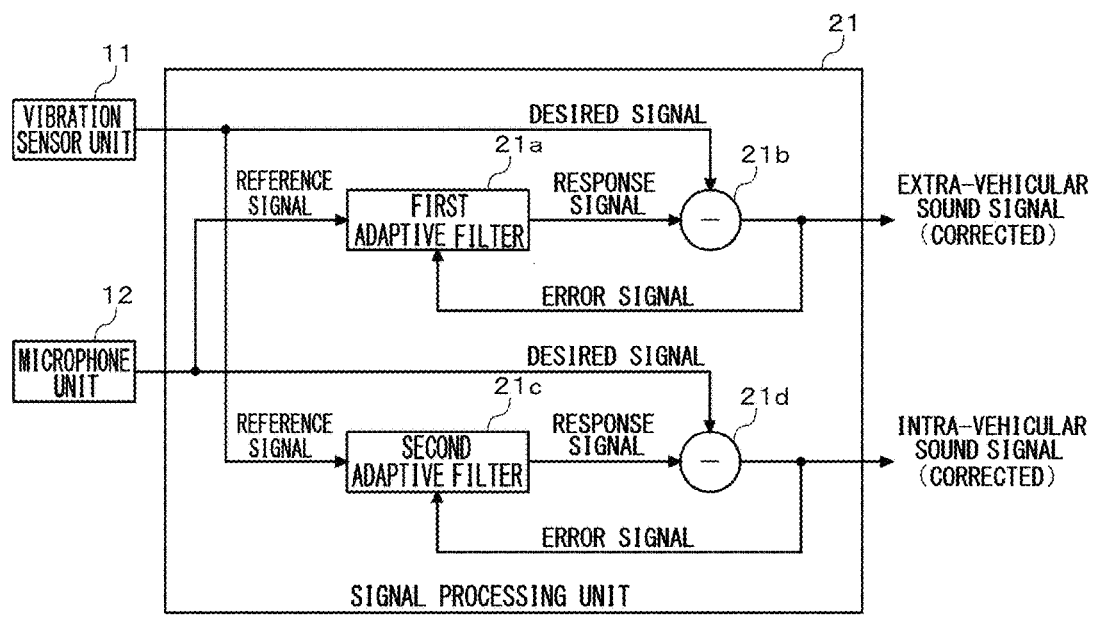
FIG. 3 is a block diagram showing an exemplary configuration of the signal processing unit of FIG. 2.

FIG. 3 is a block diagram showing an exemplary configuration of the signal processing unit 21 of FIG. 2. The signal processing unit 21 includes a first adaptive filter 21a, a first subtraction unit 21b, a second adaptive filter 21c, and a second subtraction unit 21d. An existing algorithm such as Least Mean Square (LMS) and Normalized Least Mean Square (NLMS) can be used for the first adaptive filter 21a and the second adaptive filter 21c.

The first adaptive filter 21a receives an input of the second sound signal as the reference signal from the microphone unit 12 and an input of the error signal from the first subtraction unit 21b. The first adaptive filter 21a adaptively modifies the filter coefficient in accordance with the error signal. The first adaptive filter 21a multiplies the second sound signal by the filter coefficient to generate the response signal and outputs the response signal to the first subtraction unit 21b.

The first subtraction unit 21b subtracts the response signal input from the first adaptive filter 21a from the first sound signal input as the desired signal from the vibration sensor unit 11 so as to generate the extra-vehicular sound signal and outputs the extra-vehicular sound signal to the record data creation unit 22. The extra-vehicular sound signal is fed back to the first adaptive filter 21a as the error signal. The first adaptive filter 21a modifies the filter coefficient so that the error signal is 0.

The second adaptive filter 21c receives an input of the first sound signal as the reference signal from the vibration sensor unit 11 and an input of the error signal from the second subtraction unit 21d. The second adaptive filter 21c adaptively modifies the filter coefficient in accordance with the error signal. The second adaptive filter 21c multiplies the first sound signal by the filter coefficient to generate the response signal and outputs the response signal to the second subtraction unit 21d.

The second subtraction unit 21d subtracts the response signal input from the second adaptive filter 21c from the second sound signal input as the desired signal from the microphone unit 12 so as to generate the intra-vehicular sound signal and outputs the intra-vehicular sound signal to the record data creation unit 22. The intra-vehicular sound signal is fed back to the second adaptive filter 21c as the error signal. The second adaptive filter 21c modifies the filter coefficient such that the error signal is 0.

The sound outside the vehicle, the sound inside the vehicle, and the road noise included in first sound signal input from the vibration sensor unit 11 and the second sound signal input from the microphone unit 12 are related as indicated below. As for the sound outside the vehicle, (first sound signal>second sound signal); as for the sound inside the vehicle, (first sound signal<second sound signal); and as for the road noise, (first sound signal>second sound signal).

The signal processing unit 21 outputs the extra-vehicular sound signal and the intra-vehicular sound signal thus generated to the record data creation unit 22. The signal processing unit 21 may not generate the extra-vehicular sound signal and the intra-vehicular sound signal and may output the input first sound signal and second sound signal directly to the record data creation unit 22. The signal processing unit 21 may output both the extra-vehicular sound signal and intra-vehicular sound signal thus generated, and the input first sound signal and second sound signal to the record data creation unit 22. The signal processing unit 21 may output only one of the extra-vehicular sound signal and the intra-vehicular sound signal.

The G sensor unit 13 converts the gravity exerted on the vehicle 5 into an electrical signal (hereinafter, referred to as the gravity signal), subjects the gravity signal to A/D conversion, and outputs the resultant signal to the record data creation unit 22 and the event detection unit 24. The G sensor unit 13 includes, for example, an acceleration sensor. The acceleration sensor detects the gravity generated as a result of acceleration, deceleration, swinging, etc. of the vehicle 5.

The record data creation unit 22 creates record data based on the image signal input from the imaging unit 10, the extra-vehicular sound signal and intra-vehicular sound signal input from the signal processing unit 21, and the gravity signal input from the G sensor unit 13. The record data creation unit 22 includes a buffer 22a and temporarily stores the input image signal, extra-vehicular sound signal, intra-vehicular sound signal, and gravity signal in the buffer 22a. The record data creation unit 22 synchronizes the signals recorded in the buffer 22a and builds the record data accordingly. The record data creation unit 22 may subject the built data to compression coding. The volume of the data recorded can be reduced by compression coding.

The data included in the record data created by the record data creation unit 22 is not limited to the image signal, sound signal, and gravity signal. For example, the position information, vehicle speed information, accelerator pedal position information, brake pedal position information, steering angle information, winker information, horn information, etc. may be added. The longitude and latitude information output from a GPS receiver may be used as the position information. The longitude and latitude information may be acquired in coordination with a car navigation system or a smartphone. Alternatively, a GPS receiver may be provided in the driving information recording device 1. The other information is acquired in coordination with the ECU of the vehicle 5.

The data recording unit 23 writes the record data created by the record data creation unit 22 in a recording medium 30. The recording medium 30 is a non-volatile memory and is exemplified by a flash memory, optical disk, hard disk, etc. The recording medium 30 may be a detachable removable recording medium or may be a recording medium fixed in the data recording unit 23. In the latter case, the recording medium 30 is connected to a playback device via communication. If the driving information recording device 1 is provided with a display and a speaker (not shown in FIG. 2), the data recorded in the recording medium 30 can be played back locally.

The event detection unit 24 detects an event when the amount of variation of the gravity signal input from the G sensor unit 13 per a unit time exceeds a threshold value. The gravity signal changes abruptly in the event of a sudden start, sudden stop, and sudden swinging or in the event of a collision with another vehicle or an obstacle. The abrupt change of the gravity signal is detected as an event.

Event detection information can be used in various processes. For example, the information can be used in the following processes. When the capacity of the recording medium 30 is full, the data is overwritten in the forward chronological order according to the FIFO scheme. When the event detection information is communicated to the data recording unit 23, the data recording unit 23 records the record data during a preset period of time before and after the event is detected as a separate file in an area where overwriting is prohibited. The file is maintained without being overwritten unless the user performs a user operation to delete the file.

When the event detection information is communicated to the signal processing unit 21, the signal processing unit 21 generates the extra-vehicular sound signal and the intra-vehicular sound signal from the first sound signal and the second sound signal during the preset period of time before and after the event is detected. During the other periods of time, the signal processing unit 21 does not generate the extra-vehicular sound signal and the intra-vehicular sound signal and outputs the first sound signal and the second sound signal directly to the record data creation unit 22. In this case, the load during a period of time other than when an event occurs can be reduced so that the power consumption of the controller 20 can be reduced.

When the event detection information is communicated to the record data creation unit 22, the record data creation unit 22 includes the extra-vehicular sound signal and the intra-vehicular sound signal during the preset period of time before and after the event is detected in the record data. During the other periods of time, the record data creation unit 22 does not include the extra-vehicular sound signal and the intra-vehicular sound signal in the record data, or include the first sound signal and the second sound signal in the record data. When the event detection information is communicated to the record data creation unit 22, the record data creation unit 22 includes the image signal during the preset period of time before and after the event is detected in the record data. The image signal is not included in the record data during the other periods of time. By employing a scheme like this, the data capacity required other than when an even occurs can be reduced.

As described above, according to embodiment 1, the sound outside the vehicle can be collected by providing the vibration sensor unit 11 and without adding a microphone outside the vehicle. By also collecting the sound inside the vehicle using a microphone installed in the vehicle and subjecting the sound signals collected by two sound collecting units to a signal process, the sound inside the vehicle and the sound outside the vehicle are isolated and the road noise is reduced. Therefore, the sound outside the vehicle and the sound inside the vehicle can be recorded with a high sound quality while the vehicle is traveling.

To describe it more specifically, the sound outside the vehicle arriving at the front glass 6 can be collected as a sound propagated through a solid by fitting the vibration sensor unit 11 on the inner side of the front glass 6. Installing the vibration sensor unit 11 inside the vehicle makes it water-proof, drip-proof, dust-proof, and wind-proof. Therefore, the impact from aged deterioration is reduced and the durability is improved as compared with the case of installing a microphone outside the vehicle. Since the vibration sensor unit 11 can be installed at a position in close proximity with the main unit, the cost is reduced and the installation job is easy.

It is conceivable to install a microphone outside the vehicle. For example, a water-proof microphone may be fitted with a wind jammer but the associated cost is high. A wind jammer is not water-proof and so cannot protect the microphone sufficiently in an environment with heavy rain and wind even if it is used in combination with a water-proof microphone. As a result, the aged deterioration progresses.

By subjecting the sound signals collected by the vibration sensor unit 11 and the microphone unit 12, respectively, to a digital signal process, the sound outside the vehicle and the sound inside the vehicle can be isolated with a high precision. Since the road noise collected by the vibration sensor unit 11 and the road noise collected by the microphone unit 12 cancel each other, the road noise is reduced.

More specifically, the road noise in the intra-vehicle sound signal is reduced by feeding the road noise collected by the vibration sensor unit 11 to the input of the second adaptive filter 21c as the reference signal. The signal transmitted inside the vehicle from outside the vehicle via the front glass 6 is attenuated and the signal transmitted outside the vehicle from inside the vehicle conversely is also attenuated. This characteristic can be utilized to isolate the sound outside the vehicle and the sound inside the vehicle with a high precision by switching the input signal and the reference signal in the two adaptive filters.

(Embodiment 2)

Figure 4:
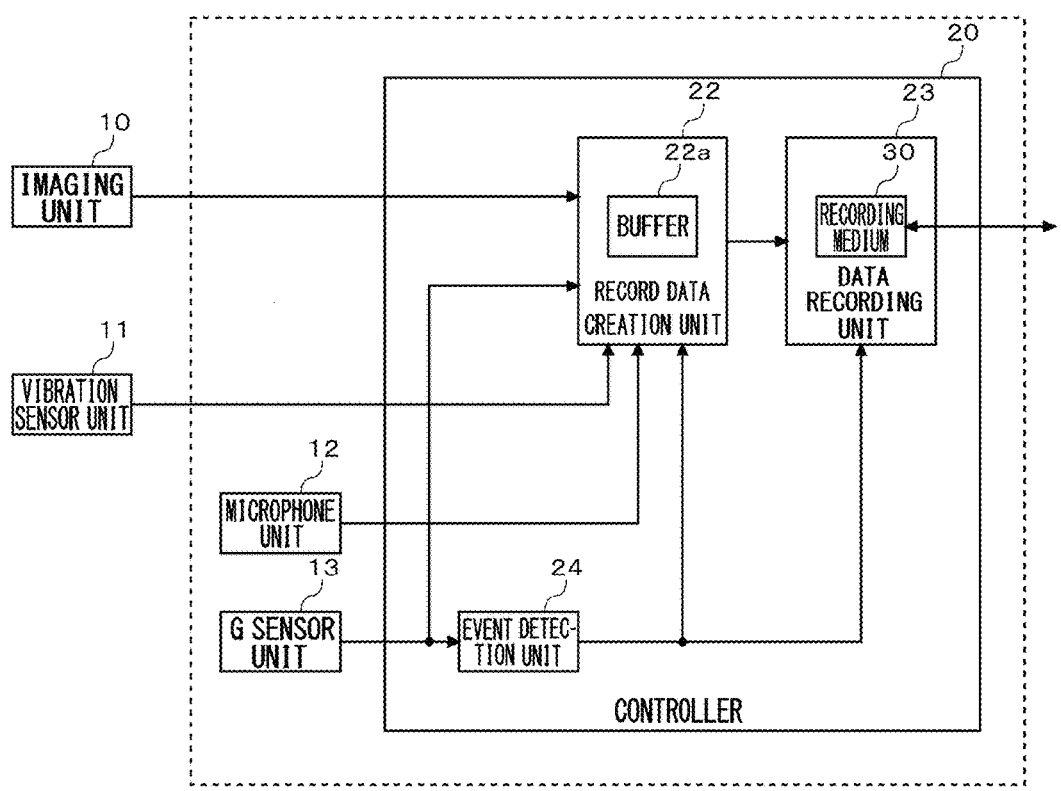
FIG. 4 is a block diagram showing a configuration of the driving information recording device according to embodiment 2 of the present invention.
Figure 5:
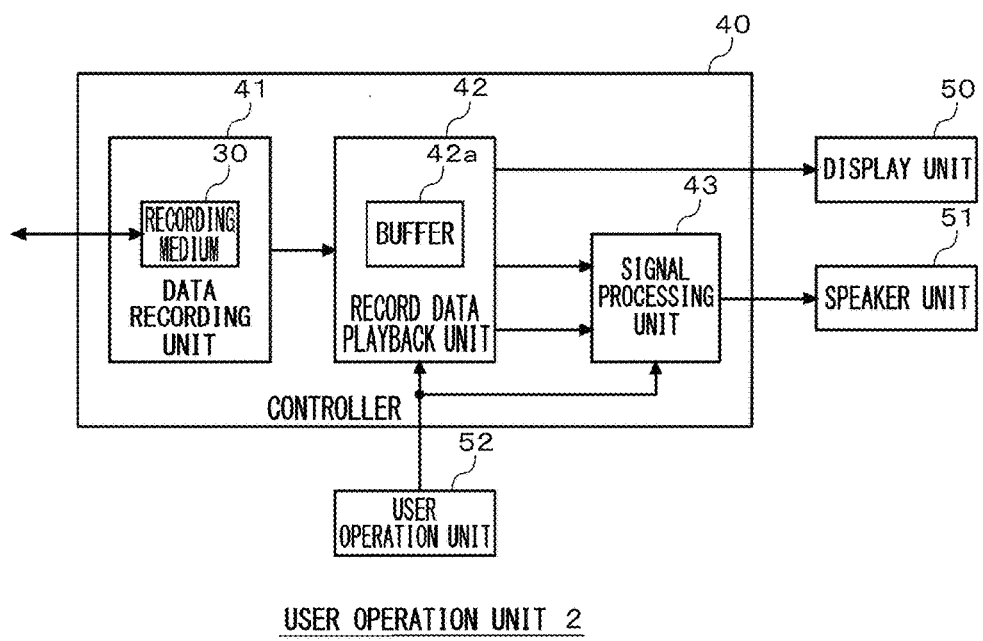
FIG. 5 is a block diagram showing a configuration of a driving information playback device according to embodiment 2 of the present invention.

FIG. 4 is a block diagram showing a configuration of the driving information recording device 1 according to embodiment 2 of the present invention. FIG. 5 is a block diagram showing a configuration of a driving information playback device 2 according to embodiment 2 of the present invention. In embodiment 1, the signal processing unit 21 that generates the extra-vehicular sound signal and the intra-vehicular sound signal based on the output signal of the vibration sensor unit 11 and the output signal of the microphone unit 12 is provided in the controller 20 of the driving information recording device 1. In embodiment 2, the signal processing unit 21 is not provided in the controller 20 of the driving information recording device 1 but is provided in a controller 40 of the driving information playback device 2.

The record data creation unit 22 of the driving information recording device 1 according to embodiment 2 creates record data based on the image signal input from the imaging unit 10, the first sound signal input from the vibration sensor unit 11, the second sound signal input from the microphone unit 12, and the gravity signal input from the G sensor unit 13.

The driving information playback device 2 shown in FIG. 5 includes a controller 40, a display unit 50, a speaker unit 51, and a user operation unit 52. The driving information playback device 2 is a device capable of playing back images and sound such as a PC, smartphone, car navigation system, etc.

The controller 40 includes a data recording unit 41, a record data playback unit 42, and a signal processing unit 43. These functional blocks are implemented by the coordination of hardware resources and software resources, or hardware resources alone. A processor, ROM, RAM, FPGA, and other LSIs can be used as hardware resources. Programs such as operating systems and applications can be used as software resources.

The recording medium 30 storing the record data created by the driving information recording device 1 is mounted in the data recording unit 41. Where the driving information recording device 1 and the driving information playback device 2 are connected by a cable or wireless communication, the record data stored in the recording medium 30 mounted in the driving information recording device 1 is transferred to the recording medium 30 mounted in the driving information playback device 2.

The data recording unit 41 reads the record data from the recording medium 30 and delivers the data to the record data playback unit 42. The record data playback unit 42 separates the record data into the image signal, the first sound signal, the second sound signal, and the gravity signal. When the record data is compression coded, the record data playback unit 42 subjects the record data to decompression and decoding before decomposing the record data.

The record data playback unit 42 includes a buffer 42a and temporarily stores the image signal, the first sound signal, the second sound signal, and the gravity signal from the decomposition in the buffer 42a. The record data playback unit 42 outputs the image signal to the display unit 50 and outputs the first sound signal and the second sound signal to the signal processing unit 43.

The display unit 50 is provided with a liquid crystal display, an organic EL display, etc. and displays the image signal input from the record data playback unit 42.

The signal processing unit 43 is provided with functions similar to those of the signal processing unit 21 according to embodiment 1. In other words, the signal processing unit 43 is provided with the function to generate the extra-vehicular sound signal by correcting the first sound signal using the second sound signal, and the function to generate the intra-vehicular signal by correcting the second sound signal using the first sound signal. The signal processing unit 43 outputs one of the first sound signal, the second sound signal, the extra-vehicular signal, and the intra-vehicular signal to the speaker unit 51 (or a headphone (not shown)) in accordance with an instruction signal set in the user operation unit 52.

The user operation unit 52 acknowledges a user operation. In this embodiment, the user operation unit 52 acknowledges a user operation designating whether to perform a signal process in the signal processing unit 43 and a user operation designating whether to play back the sound outside the vehicle, the sound inside the vehicle, or the both the sound outside the vehicle and the sound inside the vehicle. The user operation unit 52 sets an instruction signal designating whether to perform a signal process, and an instruction signal designating a channel to be played in the record data playback unit 42 and the signal processing unit 43.

When the channel designated to be played is that of the extra-vehicular sound and the signal process is not designated to be performed, the record data playback unit 42 outputs only the first sound signal to the signal processing unit 43. When the channel designated to be played is that of the intra-vehicular sound and the signal process is not designated to be performed, the record data playback unit 42 outputs only the second sound signal to the signal processing unit 43. In the case of other instructions, both the first sound signal and the second sound signal are output to the signal processing unit 43.

When the channel designated to be played is that of the extra-vehicular sound and the signal process is not designated to be performed, the signal processing unit 43 outputs the first sound signal directly to the speaker unit 51. When the channel designated to be played is that of the intra-vehicular sound and the signal process is not designated to be performed, the signal processing unit 43 outputs the second sound signal directly to the speaker unit 51. When the channels designated to be played are those of the extra-vehicular sound and the intra-vehicular sound and the signal process is not designated to be performed, the signal processing unit 43 outputs the first sound signal and the second sound signal directly to the speaker unit 51.

When the channel designated to be played is that of the extra-vehicular sound and the signal process is designated to be performed, the signal processing unit 43 corrects the first sound signal using the second sound signal so as to generate the extra-vehicular sound signal and outputs the extra-vehicular sound signal to the speaker unit 51. When the channel designated to be played is that of the intra-vehicular sound and the signal process is designated to be performed, the signal processing unit 43 corrects the second sound signal using the first sound signal so as to generate the intra-vehicular sound signal and outputs the intra-vehicular sound signal to the speaker unit 51. When the channels designated to be played are those of the extra-vehicular sound and the intra-vehicular sound and the signal process is designated to be performed, the signal processing unit 43 corrects the first sound signal using the second sound signal so as to generate the extra-vehicular sound signal, corrects the second sound signal using the first sound signal so as to generate the intra-vehicular sound signal, and outputs the extra-vehicular signal and the intra-vehicular sound signal thus generated to the speaker unit 51.

Thus, according to embodiment 2, the benefit of embodiment 1 is enjoyed and, at the same time, the load on the driving information recording device 1 is reduced by providing the signal processing unit 43 on the playback side. Accordingly, the driving information recording device 1 can be manufactured at a low cost. Also, the power consumption of the driving information recording device 1 is reduced.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiments described above, the driving information recording device 1 is described as being provided with the G sensor unit 13 and the event detection unit 24. In a continuous recording type, however, the G sensor unit 13 and the event detection unit 24 are not essential but can be omitted. It is also possible to manufacture the driving information recording device 1 that does not record images and records only sound. In that case, the imaging unit 10 may be omitted.

While the embodiment is described as recording both the sound inside the vehicle and the sound outside the vehicle, only one of the sound outside the vehicle and the sound inside the vehicle may be recorded. In that case, too, high-quality sound can be recorded by performing the signal process described above.

What is claimed is:

1. A driving information recording device comprising:
   a vibration sensor installed in contact with an interior surface of a windshield in a vehicle so as to detect solid vibration of the interior surface of the windshield and convert the solid vibration into a first electrical sound signal;
   a microphone that is provided in the vehicle and detects vibration of air inside the vehicle and converts the detected vibration of the air into a second electrical sound signal; and
   a data recording unit that records at least one of the first electrical sound signal or the second electrical sound signal in a recording medium, and
   wherein the first electrical sound signal recorded in the recording medium is corrected by removing the second electrical sound signal as a noise component from the vibration sensor, or the second electrical sound signal recorded in the recording medium is corrected by removing the first electrical sound signal as a noise component from the microphone.

2. The driving information recording device according to claim 1, further comprising:
   a signal processing unit comprising:
      a first adaptive filter that generates a response signal by filtering the sound signal detected by the microphone;
      a first subtraction unit that subtracts the response signal generated by the first adaptive filter from the sound signal detected by the vibration sensor and outputs a resultant signal;
      a second adaptive filter that generates a response signal by filtering the sound signal detected by the vibration sensor; and
      a second subtraction unit that subtracts the response signal generated by the second adaptive filter from the sound signal detected by the microphone and outputs a resultant signal, wherein:
      the first adaptive filter modifies a filter coefficient in accordance with an error signal output from the first subtraction unit, and
      the second adaptive filter modifies a filter coefficient in accordance with an error signal output from the second subtraction unit.

3. The driving information recording device according to claim 1, further comprising:
   an imaging unit installed on an inner side of a front glass of the vehicle, wherein
   the data recording unit records an image signal of an image captured by the imaging unit in the recording medium.

4. The driving information recording device according to claim 3, wherein the vibration sensor is fitted to a mounting fixture of the imaging unit in contact with a front glass.

5. The driving information recording device according to claim 1, wherein the vibration sensor is an acceleration sensor or a diaphragm.

6. The driving information recording device according to claim 1, wherein the first electrical sound signal is corrected by reducing a sound inside the vehicle and road noise and generates an extra-vehicular sound signal in which sound outside the vehicle is emphasized.

7. The driving information recording device according to claim 1, wherein the sound second electrical signal is corrected by reducing a sound outside the vehicle and road noise and generates an intra-vehicular sound signal in which sound inside the vehicle is emphasized.

8. A driving information playback device comprising:
   a signal processing unit that performs at least one of:
      i) a process of correcting a first electrical sound signal by removing a second electrical sound signal as a noise component from a vibration sensor,
      ii) a process of correcting the second electrical sound signal by removing the first electrical sound signal as a noise component from a microphone; and
   a sound playback unit that plays back the first electrical sound signal generated by the vibration sensor and corrected by the signal processing unit, or the second electrical sound signal generated by the microphone and corrected by the signal processing unit,
   wherein the first electrical sound signal is generated by the vibration sensor,
   wherein the second electrical sound signal is generated by the microphone,
   wherein the vibration sensor, installed in contact with an inner surface of a windshield in a vehicle:

detects solid vibration of the inner surface of the windshield, and converts the solid vibration into the first electrical sound signal, and wherein the microphone is provided in the vehicle and detects vibration of air in the vehicle and converts the vibration of the air into the second electrical sound signal.

9. The driving information playback device according to claim 8, wherein the vibration sensor is an acceleration sensor or a diaphragm.

10. A controlling device comprising:
a signal processing unit that performs at least one of:
   i) a process of correcting a first electrical sound signal by removing a second electrical sound signal as a noise component from a vibration sensor,
   ii) a process of correcting the second electrical sound signal by removing the first electrical sound signal as a noise component from a microphone; and
a data recording unit that records at least one of the first electrical sound signal generated by the vibration sensor and corrected by the signal processing unit, and the second electrical sound signal generated by the microphone and corrected by the signal processing unit in a recording medium, wherein the first electrical sound signal is generated by the vibration sensor, wherein the second electrical sound signal is generated by the microphone, wherein the vibration sensor, installed in contact with an inner surface of a windshield in a vehicle:
   detects solid vibration of the inner surface of the windshield, and
   converts the solid vibration into the first electrical sound signal, and wherein the microphone is provided in the vehicle and detects vibration of air in the vehicle and converts the vibration of the air into the second electrical sound signal.

11. The controlling device according to claim 10, wherein the vibration sensor is an acceleration sensor or a diaphragm.

* * * * *